(12) United States Patent
Saez Lopez et al.

(10) Patent No.: US 11,865,793 B2
(45) Date of Patent: Jan. 9, 2024

(54) PRODUCTION OF COLLAPSIBLE POUCHES

(71) Applicant: Scholle IPN IP BV, Tilburg (NL)

(72) Inventors: Abel Saez Lopez, Barcelona (ES); Laurens Last, Tilburg (NL); Johannes Wilhelmus Van Tuil, Barcelona (ES); Jordi Canada Codina, Barcelona (ES); Jordi Vidal Camps, Barcelona (ES); Juan Rojas Segura, Barcelona (ES)

(73) Assignee: SCHOLLE IPN IP BV, Tilburg (NL)

( * ) Notice: Subject to any disclaimer, the term of this patent is extended or adjusted under 35 U.S.C. 154(b) by 0 days.

(21) Appl. No.: 17/631,444

(22) PCT Filed: Jul. 28, 2020

(86) PCT No.: PCT/EP2020/071307
§ 371 (c)(1),
(2) Date: Jan. 28, 2022

(87) PCT Pub. No.: WO2021/018914
PCT Pub. Date: Feb. 4, 2021

(65) Prior Publication Data
US 2022/0266542 A1 Aug. 25, 2022

(30) Foreign Application Priority Data

Jul. 29, 2019 (NL) ..................................... 2023585
Oct. 16, 2019 (NL) ..................................... 2024025

(51) Int. Cl.
*B29C 65/18* (2006.01)
*B29C 65/00* (2006.01)
(Continued)

(52) U.S. Cl.
CPC ............ *B29C 66/849* (2013.01); *B29C 65/18* (2013.01); *B29C 65/32* (2013.01); *B29C 65/38* (2013.01);
(Continued)

(58) Field of Classification Search
CPC .............. B29C 66/849; B29C 66/0044; B29C 66/1122; B29C 66/244; B29C 66/3494;
(Continued)

(56) References Cited

U.S. PATENT DOCUMENTS 6,182,426 B1 * 2/2001 Pritchard .............. B29C 66/849
53/551

FOREIGN PATENT DOCUMENTS

CN 106232327 A 12/2016
EP 0634328 A1 * 1/1995
(Continued)

*Primary Examiner* — Nathaniel C Chukwurah
*Assistant Examiner* — Mary C Hibbert-Copeland
(74) *Attorney, Agent, or Firm* — The Watson IP Group, PLC; Jovan N. Jovanovic

(57) ABSTRACT

The present invention relates to a production machine for the production of collapsible pouches, which comprises an impulse sealing device with a first jaw and a second jaw for contacting bottom regions of walls of the pouches. Each jaw comprises a susceptor element comprising electrically conductive material, having a front surface that is at least shaped as an inverted T for sealing side edges and at least a portion of bottom edges of two adjacent interconnected pouches. Each jaw comprises an inductor which is electrically insulated from the respective susceptor element. The machine comprises a high frequency electric current source, which is connected to the inductors. At least one of the jaws comprises a cooling device for cooling down the respective inductor and susceptor element. The machine is configured so that, in an impulse sealing cycle for sealing the bottom regions of the pouch walls, the electric current source is operated to temporarily feed a high frequency electric current to the inductors, thereby generating a high frequency electromagnetic field with the inductors. The high frequency electromagnetic field induces eddy currents in the respective susceptor element generating an impulse of heat that is
(Continued)

Figure 1:
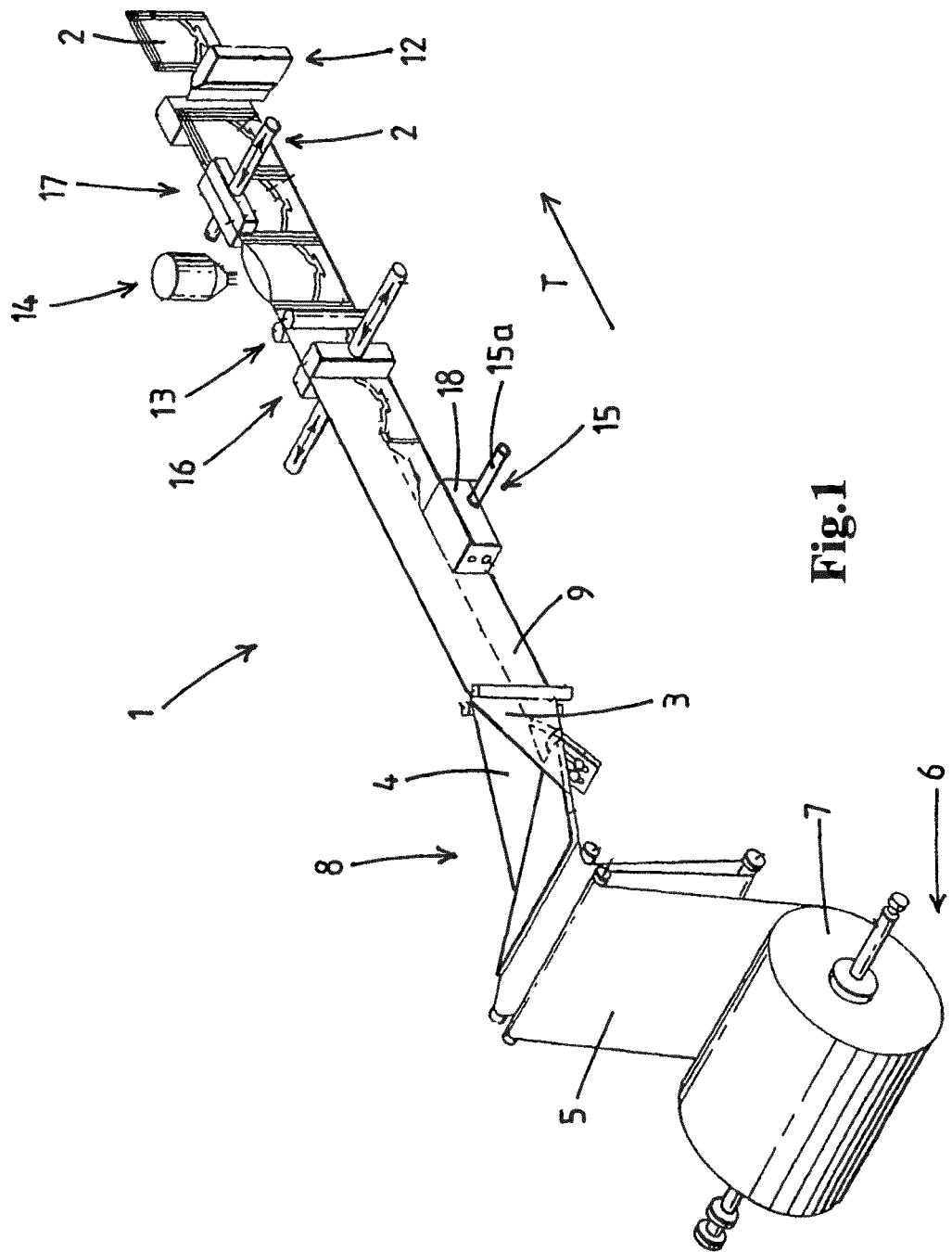

emitted by the susceptor element, which impulses of heat seal the bottom regions of the pouch walls to each other.

15 Claims, 11 Drawing Sheets

(51) Int. Cl.
    *B29C 65/32*     (2006.01)
    *B29C 65/38*     (2006.01)
    *B65B 51/30*     (2006.01)
    *B65D 75/00*     (2006.01)

(52) U.S. Cl.
    CPC ...... *B29C 66/0044* (2013.01); *B29C 66/1122* (2013.01); *B29C 66/244* (2013.01); *B29C 66/3494* (2013.01); *B29C 66/431* (2013.01); *B29C 66/73921* (2013.01); *B29C 66/8122* (2013.01); *B29C 66/81871* (2013.01); *B29C 66/83221* (2013.01); *B29C 66/83543* (2013.01); *B29C 66/919* (2013.01); *B29C 66/91651* (2013.01); *B29C 66/949* (2013.01); *B65B 51/30* (2013.01); *B29C 2793/009* (2013.01); *B65D 75/008* (2013.01)

(58) Field of Classification Search
    CPC ............ B29C 66/431; B29C 66/73921; B29C 66/8122; B29C 66/81871; B29C 66/83221; B29C 66/83543; B29C 66/91651; B29C 66/919; B29C 66/949; B29C 65/18; B29C 65/32; B29C 2793/009; B65B 51/30; B65D 75/008
    USPC .......................................................... 53/558
    See application file for complete search history.

(56) References Cited

FOREIGN PATENT DOCUMENTS

| | | | | |
|---|---|---|---|---|
| GB | 2566476 | A | 3/2019 | |
| JP | H092427 | A * | 6/1995 | ....... B29C 66/81811 |
| JP | H092427 | A | 1/1997 | |
| JP | 2007245486 | A | 9/2007 | |
| WO | 0023327 | A1 | 4/2000 | |

* cited by examiner

PRODUCTION OF COLLAPSIBLE POUCHES

The present invention relates to the production of collapsible pouches.

For the production of collapsible pouches it is known to make use of a production machine having a sealing station that is configured to heat seal a bottom region of pouches in a string of interconnected pouches made from heat-sealable film material in order to form the bottom of a pouch. Pouch production machines are also known in embodiments wherein a bottom gusset is formed to create collapsible standing pouches.

In a well-known embodiment, the sealing station comprises a sealing device with a first jaw and a second jaw and with an actuator device configured to move the first and second jaws relative to one another between an opened position and a clamped position. In this sealing device, each of the jaws has a front surface configured to contact the bottom region of a respective first or second wall of the pouches. The front surfaces of the jaws each define planar face portions. The jaws of the known sealing device are continuously heated, e.g. electrically, to a temperature suited for heat sealing. This is known as the hot-bar sealing technique. In operation, the continuously heated jaws are moved into the clamped position, having the pouch walls in between the jaws. The maximum temperature of the heated jaws is generally limited by the characteristics of the film material of the pouch. Time, pressure, and temperature are the main parameters that govern this heat sealing process. The pressure is commonly rather significant to effect a proper sealing.

In view of the conditions during this common practice type of heat sealing of bottom regions of pouches, e.g. for heat sealing pouches having a bottom gusset, several developments have been made over the years. For example, JP2007245486 discloses a pouch production system that comprises continuously heated jaws for sealing a bottom gusset region of pouches.

In JP2007245486, it is further disclosed that during a sealing cycle the string of interconnected pouches is positioned in between the first jaw and the second jaw. The heated jaws herein project partially over the bottom gusset regions of two adjacent and interconnected pouches. The jaws are configured to simultaneously seal a part of the bottom gusset region of the first pouch and to seal a part of the bottom gusset region of the adjacent and still interconnected second pouch in one sealing cycle. Additionally, the jaws are also configured to seal the adjacent side edges of both adjacent interconnected pouches. During a single sealing cycle, the sealing station is thus configured to provide a single triple point gusset seal in each of the two adjacent interconnected pouches.

In the field of pouch production, it is known to make use of an impulse sealing device, such as offered by ROPEX Industrie-Elektronik GmbH, Bietigheim-Bissingen, Germany. In known embodiments of such an impulse sealing device at least one of the jaws has a single, elongated, impulse heatable resistor band that extends along the front surface of the jaw and is covered by a heat-resistant non-stick covering, e.g. a Teflon tape. The device is configured to perform an impulse sealing cycle, wherein the actuator device is configured to bring the first and second jaws into the clamped position, e.g. with two walls of heat sealable film material in between. The sealing device is configured to, in the clamped position, temporarily pass an electric current through the resistor band so as to generate an impulse of heat that is emitted by the resistor band. This brief impulse of heat seals the walls onto each other. The jaw cools down after termination of the energizing of the resistor band, assisted therein by operation of the associated cooling device. The actuator device is configured to move the first and second jaws into the opened position after the cooling down has been achieved. The temperature of the resistor band may in practical embodiments increase from room temperature or a slightly elevated temperature extremely fast to 300° C. or thereabout, so in general very fast to a very high temperature which is maintained only for a very short duration. The impulse sealing approach is for instance discussed in DE19737471.

The above impulse sealing device has the drawback that the temperature distribution over the resistor band cannot be controlled accurately during the relatively short pulse time. As a result, the sealing properties may not be accurate over the entire contour of the area that is to be sealed. In particular for sealing bottom regions of collapsible pouches, for example for sealing bottom gusset portions of collapsible standing pouches, such quality is essential for achieving sufficiently low production failure rates.

The present invention aims to provide measures that provide an improved production of collapsible pouches, preferably of collapsible standing pouches comprising a bottom gusset.

The present invention aims to provide measures that enhance the quality of the seal that is obtained in the film material of the pouch wall at its bottom region, for example at the bottom gusset region and at the triple points of a bottom gusset type standing collapsible pouch.

The invention provides a production machine for the production of collapsible pouches, preferably of collapsible standing pouches comprising a bottom gusset, said pouches each having walls made from heat-sealable film material, preferably metal-free heat-sealable film material, wherein the production machine comprises a sealing station that is configured to heat seal bottom regions of two adjacent pouches in a string of interconnected pouches made from heat-sealable film material, wherein the sealing station comprises:
an impulse sealing device comprising a first jaw and a second jaw,
an actuator device configured to move the first and second jaws relative to one another between an opened position and a clamped position,
a cooling device configured to cool at least one, preferably each, of the first and second jaws,
wherein the first jaw has a first front surface configured to contact bottom regions of a respective first wall of two adjacent pouches,
wherein the second jaw has a second front surface configured to contact the bottom regions of a respective second wall of the two adjacent pouches,
wherein at least one, preferably each, of the first and second jaws comprises at the respective front surface thereof at least one impulse heatable member that extends along the front surface and that is covered by a heat-resistant non-stick covering,
wherein the production machine is configured such that, in operation, the string of interconnected pouches is positioned between the first and second jaws and such that the impulse heatable members of the first and second jaws each project at least partially over the bottom regions of two adjacent pouches,
and wherein the sealing station is configured to perform an impulse sealing cycle, wherein the actuator device is configured to bring the first and second jaws into the clamped position, so that—in the bottom regions—the first and second walls are clamped against one another by the front surfaces of the first and second jaws, and wherein the sealing station is configured to, in the clamped position, temporarily energize the one or more impulse heatable members so as to generate an impulse of heat that is emitted by each of the one or more impulse heatable members, which one or more impulses of heat seal to each other at least parts of the bottom regions of the first and second walls of the two adjacent interconnected pouches, wherein the first and second jaws, at least the one or more impulse heatable members thereof, cool down after termination of the energizing assisted therein by operation of the cooling device, and wherein the actuator device is configured to move the first and second jaws into the opened position after the one or more impulse heatable members have cooled down, wherein each impulse heatable member is a susceptor element comprising electrically conductive material, said susceptor element having a rear side facing away from the respective front surface, wherein each of the susceptor elements has a front surface that is at least shaped as an inverted T, such that the heat impulse is configured to seal at least a portion of side edge regions of the two adjacent interconnected pouches and to seal at least a portion of bottom edge regions of the two adjacent interconnected pouches, and wherein at least one, preferably each, of the first and second jaws comprises an inductor which is electrically insulated from the respective susceptor element, wherein the inductor comprises an elongated inductor section that extends along the respective front surface at the rear side of the respective at least one susceptor element, and wherein the sealing station comprises a high frequency electric current source, which is connected to the inductor of at least one, preferably each, of the first and second jaws, wherein the sealing station is configured so that, in the impulse sealing cycle, the electric current source is operated to temporarily feed a high frequency electric current to the one or more inductors, thereby generating a high frequency electromagnetic field with the one or more inductors, wherein the high frequency electromagnetic field induces eddy currents in the respective susceptor element generating an impulse of heat that is emitted by the susceptor element, which one or more impulses of heat seal the bottom regions of the pouches.

Due to the extension of the at least one elongated inductor section at the rear side of the at least one susceptor element, preferably in close proximity to said rear side, and along the front surface, the development of heat over the extension of the front of the jaw takes place in an attractive manner, in particular in a rather uniform manner. The elongation of the inductor section contributes to the homogeneity of the current density within the inductor section, e.g. compared to a coiled or another rather irregular shape of an inductor section.

This homogeneity translates into homogeneity of the high frequency field, and thereby to homogeneity of the impulse heating of the susceptor element.

Compared to the resistive heating in the known impulse heating devices, the impulse heating by means of an inductor element and susceptor element allows for more accurate controlling of the heating. The latter contributes to a reliable and effective heat sealing between the walls of film material.

During the sealing of collapsible pouches without a bottom gusset, the pouch walls are clamped against each other directly in the bottom region. Herein, it may suffice to have one of the first and the second jaw provided with a susceptor element and an inductor and the other jaw merely being embodied and operated as a passive counter jaw.

In the production of collapsible pouches having a bottom gusset, the string of interconnected pouches fed to the sealing station has the first wall, a first bottom gusset portion, a second bottom gusset portion, and the second wall, generally in a W-shape as is known in the art. Also, as known in the art, a so-called triple point is present at each of the side edges of the pouch, wherein above the triple point the first and second wall are in direct contact with another and wherein below the triple point the two gusset portions are located between the first and second wall. So at the triple point the thickness changes between two times the wall thickness and four times the wall thickness. Near this transition sealing is notoriously difficult by existing techniques. In the clamped position the first and second walls and bottom gusset portions of the two adjacent interconnected pouches are clamped against one another by the front surfaces of the first and second jaws.

In a machine for production of bottom gusset type pouches both the first and the second jaw are each provided with a susceptor element and an inductor in order to seal the first gusset portion against the first wall and to seal the second gusset portion against the second wall. In an embodiment, both the first and second jaw are provided with a susceptor element and an inductor. Herein, in an embodiment, the inductors may be energized simultaneously. However, it is also possible to have a non-simultaneous energizing of the inductors. This could be non-simultaneous during a single cycle. When sealing pouches lacking a bottom gusset one could envisage that one jaw is operated for impulse sealing during one cycle, and the other jaw is only operated during the next cycle, e.g. as providing an heat impulse by one jaw may provide sufficient heat to obtain a desirable heat seal in the bottom regions.

Energizing an inductor during an impulse sealing cycle may consist of a single, short period of high frequency electric current being passed through the inductor. It may also be done different, e.g. in even shorter periods in succession, e.g. with different intensities of electric current being passed through the inductor during a single impulse sealing cycle.

The provision of the induction impulse heatable member may provide that the start-up time, e.g. the time wherein the sealing station can become operable from an inactive state, is fairly limited. Compared to the known sealing stations with continuously heated jaws, it is not necessary to bring the jaws towards the sealing temperature, which requires up to 30 minutes in the prior art sealing stations. Instead, in the inventive approach the jaws of the sealing station may take less time to reach a steady state temperature, typically only in between 1 and 2 minutes, for example after the sealing station has been modified to make a different type of seal, e.g. for a different packaging.

The homogeneity of the heat sealing and the impulse process allow to have a minimal clamping force of the jaws in the clamped position, e.g. far less than with the traditional continuous heated jaws. The clamping force may effectively only serve to assure an intimate surface contact between the pouch walls and the inward located gusset portions when present.

For the sealing of bottom regions of pouches with a bottom gusset, the clamping force may be selected larger than the clamping force for welding bottom regions without a bottom gusset, e.g. in view of reliably expelling air from clamped parts of the pouch, e.g. at the triple point.

It has been found by the applicant that the impulse heating with the inductor and susceptor elements are in particular favourable for, but not limited to, sealing the bottom gussets of pouches.

In the production of bottom gusset type pouches, the accurate control of the heating provides that, in the part of the pouch at and below the triple point, sufficient heat is provided to seal each gusset portion to the respective first or second wall, and that the amount of heat will not be too large, in order to prevent that the gusset portions are welded to each other.

The inverted T-shaped susceptor elements each comprise three elongated susceptor parts, which are interconnected at a central portion of the susceptor element. In operation, a first one of the elongate susceptor parts projects towards a top end of the pouches and projects over the side edges of the two adjacent interconnected pouches, e.g. at least over a lower portion of said side edges. In operation, this upward elongate susceptor part thereby at least partially seals the side edges of the adjacent interconnected pouches.

In embodiments, this upward elongate susceptor part may be substantially straight, in order to provide for a substantially straight side seal of the pouch. In alternative embodiments, the upward elongate susceptor part may have a curved or wave-like shape, in order to provide side seals of the pouches that have a curved or wave-like shape.

The T-shaped susceptor elements may be embodied, as illustrated herein, to provide a rounded bottom corner seal. This is not only advantageous for collapsible standing pouches with a bottom gusset, but also for simple collapsible pouches, for example as rounded bottom corners may allow for more convenient filling of the pouch and/or for more appealing aesthetics of a filled pouch, for example having fewer wrinkles in the pouch walls when filled. In another embodiment, the obtained shape of the seal at the bottom and the corners is as is known for a K-seal stand-up pouch.

Each of the other elongate susceptor parts at least has a component that projects away sideways from the upward elongated susceptor part, e.g. in a sideways and downward direction, over a bottom region of a respective pouch. In operation, each of these sideways oriented elongated susceptor parts thereby at least seals a portion of the respective bottom regions of the adjacent interconnected pouches.

The present invention further provides a production machine for the production of collapsible pouches as is claimed at least in claim 1, wherein the feature of the sealing station that is configured to heat seal bottom regions of two adjacent pouches in a string of interconnected pouches made from heat-sealable film material is substituted by a sealing station that is configured to heat seal top regions of two adjacent pouches in a string of interconnected pouches made from heat-sealable film material and wherein the feature that each of the susceptor elements has a front surface that is at least shaped as an inverted T, such that the heat impulse is configured to seal at least a portion of side edge regions of the two adjacent interconnected pouches and to seal at least a portion of bottom edge regions of the two adjacent interconnected pouches is replaced by the feature that each of the susceptor elements has a front surface that is at least shaped as a T, such that the heat impulse is configured to seal at least a portion of side edge regions of the two adjacent interconnected pouches and to seal at least a portion of top edge regions of the two adjacent interconnected pouches.

The present invention further provides a production machine for the production of collapsible pouches as is claimed at least in claim 1, wherein the feature of the sealing station that is configured to heat seal bottom regions of two adjacent pouches in a string of interconnected pouches made from heat-sealable film material is substituted by a sealing station that is configured to heat seal top regions, bottom regions and intermediate side regions of two adjacent pouches in a string of interconnected pouches made from heat-sealable film material and wherein the feature that each of the susceptor elements has a front surface that is at least shaped as an inverted T, such that the heat impulse is configured to seal at least a portion of side edge regions of the two adjacent interconnected pouches and to seal at least a portion of bottom edge regions of the two adjacent interconnected pouches is replaced by the feature that each of the susceptor elements has a front surface that is at least shaped as an I, such that the heat impulse is configured to seal at least a portion of side edge regions of the two adjacent interconnected pouches, to seal at least a portion of top edge regions of the two adjacent interconnected pouches and to seal at least a portion of bottom edge regions of the two adjacent interconnected pouches.

In an embodiment, the elongated inductor section is made from a metal, e.g. of copper.

In embodiments, the at least one elongated inductor section is a solid cross-section metal or other, preferably high conductivity material inductor section, e.g. made of copper which is preferred. This arrangement allows to avoid undue variations of current density within the inductor section, and thereby undesirable variation in the generated field, e.g. compared to an internally hollow inductor section.

In embodiments, the at least one elongated inductor section has a constant cross-section, preferably a solid cross-section, over its length along the front surface of the respective jaw. This design avoids undue variations of current density within the inductor section, which might otherwise occur at locations where the cross-section changes, and thereby undesirable variation in the generated field.

In embodiments, the uniform cross-section elongated inductor section has, seen in a top view onto the jaw, a shape corresponding to the front surface of the jaw and maintains a uniform distance between the susceptor element and the elongated inductor section. This arrangement enhances uniformity of the development of heat in the susceptor element.

In alternative embodiments, the inductor may have a non-constant cross-section, for example locally having a cross-section that is narrower than a nominal cross-section, to increase locally the current density for the high-frequency electric current, in order to locally increase the intensity of the heat impulse emitted by the susceptor element.

In embodiments, the distance between the inductor and the susceptor element may locally vary from the uniform, e.g. nominal distance between the inductor and the susceptor element. With a distance that is locally narrower, for example, the electric magnetic field in the susceptor is increased locally, in order to locally increase the intensity of the heat impulse emitted by the susceptor element.

In embodiments, the distance between the inductor and the susceptor element may locally vary from the uniform, e.g. nominal distance between the inductor and the susceptor element. With a distance that is locally narrower, for example, the electric magnetic field in the susceptor is increased locally, in order to locally increase the intensity of the heat impulse emitted by the susceptor element.

This local variation in the cross-section of the inductor and the distance between the inductor and the susceptor element may be beneficial in the sealing of a side seal across the triple point in a bottom gusset pouch. Above the triple point, two layers of heat-sealable film material are sealed, whereas four layer of heat-sealable film material are sealed below the triple point, requiring a larger amount of heat to obtain a seal with a sufficient quality.

Accordingly, the cross-section of the part of the inductor that is configured to project above the triple point may be selected larger than the cross-section of the part of the inductor that is configured to project below the triple point, in order to effect a larger current density below the triple point.

Similarly, above the triple point, the distance between the inductor and the susceptor element to project may be selected larger than the distance between the inductor and the susceptor element below the triple point, in order to effect a larger current density below the triple point In embodiments, the inductor of a jaw comprises multiple elongated inductor parts, e.g. three elongated inductor parts that are serially connected at a central portion of the inductor. A first one of the elongated inductor parts thereby projects over the upward elongate susceptor part. A respective second and third elongated inductor part thereby project over the respective sideways elongate susceptor parts. As such, the shape of the inductor substantially corresponds to the shape of the susceptor element, in order to provide an even distribution of eddy currents in the susceptor element.

In embodiments, the inductor of a jaw comprises multiple elongated inductor sections that are parallel to one another.

In embodiments, the inductor of a jaw comprises multiple elongated inductor sections that extend along each other and that are spaced from one another by a slit, e.g. an air slit or a slit filled with electrically insulating material.

In embodiments, the inductor comprises three elongated inductor sections. A first elongated inductor section spans over a first, e.g. sideways, downward elongated inductor part and the upward elongated inductor part. A second elongated inductor section spans over the upward elongated inductor part and a second, e.g. sideways, downward elongated inductor part. A third elongated inductor section spans over the second, e.g. sideways, downward elongated inductor part and the first, e.g. sideways, downward elongated inductor part. The elongated inductor sections extend parallel to one another and spaced from one another by a slit, thereby following the inverted T-shape of the susceptor element and thereby being arranged in proximity of the rear side of the susceptor element.

In embodiments, a slit between neighbouring inductor sections that are arranged adjacent one another spans between 0.01 and 5 mm, more preferably between 0.1 and 2 mm.

The presence of the slit between the adjacent elongated inductor sections allows for a desirable concentration of the field that is generated by the inductor of the jaw. In an embodiment the susceptor element extends, seen in a view onto the front surface of the jaw, over the slit between parallel inductor sections.

In an embodiment, the susceptor element, seen in a view onto the front of the jaw, extends over the slit between parallel elongated inductor sections and overlaps in said view with each of the parallel inductor sections. In an embodiment, the susceptor element overlaps the entire parallel inductor sections. In another embodiment, the amount of overlap between the susceptor element and the parallel inductor sections is limited, for example the susceptor element overlaps with each inductor section over about less than 25%. The size of the susceptor element is generally chosen in accordance with the seal to be made.

In an embodiment, the susceptor element is embodied as an inverted T-shaped strip that extends over the slit between parallel elongated inductor sections and overlaps in said view with each of the parallel inductor section.

With the strip-like susceptor element extending over the slit, the field generated by the inductor is advantageously concentrated in the susceptor element.

In an embodiment, the inductor of a jaw is embodied so that in a pair of adjacent and parallel inductor sections that are arranged at the rear side of the susceptor element, the current flows in the same direction through the inductor sections.

In an embodiment, the inductor of a jaw is embodied so that in a pair of adjacent and parallel inductor sections arranged at the rear side of the susceptor element, the current flows in opposite directions through the inductor sections.

In an embodiment, the inductor of a jaw has the shape of an inverted T and comprises the first, second and third inductor sections being interconnected, e.g. by a bent portion, in series, wherein the free ends of the inductor sections have terminals for electrical connection to the current source.

In an embodiment, the first and/or second jaw is provided with one inverted-T-shaped inductor element, having parallel first, second and third inductor sections interconnected in series, wherein the free ends of the inductor sections have terminals for electrical connection to the current source.

In an embodiment, the at least one elongated inductor section has a thickness of between 1.0 mm and 4.0 mm, seen perpendicular to the front surface of the jaw, for example between 1.5 mm and 3.0 mm. The limited thickness of the inductor element enhances the cooling of the jaw, including the inductor of the jaw, e.g. as one or more cooling fluid ducts are preferably arranged in proximity of a rear side of the at least one inductor element.

In an embodiment, the at least one elongated inductor section has a rectangular cross-section with a width that is greater than the thickness of the inductor section. This arrangement allows to limit the thickness, which allows for efficient cooling.

Each jaw may be provided with one or more cooling fluid ducts, e.g. the cooling fluid being a cooling liquid, e.g. water, being passed through the cooling fluid ducts, e.g. using a pump assembly, e.g. a cooling liquid circuit being a closed circuit including a heat exchanger configured to remove heat from the cooling liquid.

In an embodiment, or in combination with cooling by means of cooling liquid, air cooling can be employed for the jaws. Yet, due to the capacity, cooling by means of cooling liquid is preferred. Preferably, the cooling liquid is passed in close proximity to the inductor of the jaw, e.g. directly behind the one or more elongated inductor sections. Preferably, no cooling fluid is passed in a region between the inductor and the susceptor element as that would unduly increase the distance between them and would impair effectivity of the impulse heating induced by the field. It will be appreciated, that in view of the desired very close proximity of the susceptor element to the front surface of the jaw, there is in practice no space for any cooling duct in said region. So, in practical embodiments, cooling of the jaw is preferably done using a control flow of cooling fluid, e.g. liquid, through one or more ducts that are arranged behind, and preferably in close proximity to, the inductor sections.

In an embodiment, at least one cooling fluid duct extends along the at least one inductor section that extends along the rear side of the susceptor element.

For example, the one or more cooling ducts are provided, e.g. machined, in the main body.

The main body can be 3D-printed if desired.

In embodiments, one or both jaws have a main body, e.g. of plastic or ceramic material, e.g. a heat-resistant material, e.g. of PEEK, on which the susceptor element and/or the inductor are mounted. The plastic or ceramic material is selected to not impair the field that is generated by the inductor, at least not in an undesirable manner. Boron nitride and/or Aluminium nitride, Polyphenylene sulphide, vulcanized silicone materials can be considered as well for the main body. In particular, Boron nitride provides for a good thermal conductivity, thereby enabling a good conductivity of heat from the susceptor element and inductor towards the cooling device, e.g. towards the cooling fluid circulated through the jaw.

It is preferred for the machine to be configured such that cooling of the jaw is active during the entire impulse sealing cycle, so also during the creation of the heat impulse which happens so fast that it is generally not impaired by the cooling. In another configuration the cooling may be interrupted or reduced around the moment of the heat impulse.

The cooling of the jaws may, as preferred, be configured to cause cooling of the heat-sealed bottom region before the jaws are opened, e.g. the film material being cooled to below 60° C. before opening, e.g. to below 40° C.

In an embodiment, the susceptor element is made of metal material, e.g. a metal or a metal alloy, e.g. of a thin metal strip.

For example, the susceptor element is made of, or comprises, aluminium, nickel, silver, stainless steel, molybdenum and/or nickel-chrome.

In an embodiment, the susceptor element is embodied as an inverted T-shaped plate having opposed front and rear main faces that define the thickness of the plate between them. In an embodiment, the thickness of the susceptor element plate is constant over the extension of the plate.

In an embodiment, the susceptor element comprises a paramagnetic material, a diamagnetic material, or a ferromagnetic material. Such magnetic materials may be effected by an electromagnetic field, in order to achieve eddy currents that cause the mentioned rapid heating in the impulse sealing technique.

In an embodiment, each of the elongated susceptor parts is shaped as a strip, e.g. of a metal, e.g. of aluminium.

In an embodiment, the jaw is provided with a single continuous susceptor element embodied as an inverted T-shaped plate, e.g. of metal.

In an embodiment, the susceptor element, e.g. embodied as a plate, has a thickness of between 0.01 and 5 mm, preferably between 0.05 and 2 mm, more preferably between 0.08 and 0.8 mm, e.g. of between 0.08 and 0.5 mm.

In embodiments, the thickness of the susceptor element may differ locally from a nominal thickness. For example, the susceptor element may comprise a thickened portion at its rear surface, e.g. facing away from the front surface of the jaw, to locally increase the intensity of the electromagnetic field in the susceptor element, in order to locally increase the intensity of the heat impulse that is emitted by the susceptor element.

In general, it is considered desirable to have a minimum thickness of the susceptor element in view of the desire to rapid cool the jaw, including the inductor and the susceptor, after termination of the heat impulse. A thin design of the susceptor, contributes to this desire. It is noted that, in contrast to the impulse sealing device addressed in the introduction, no electric current from a current source is passed through the susceptor, so the cross-section need not be designed to deal with such a current flow.

Furthermore, the minimum thickness of the susceptor element is favourable for sealing the pouch at the triple points in the side seals.

At the triple point, a discrete transition is present in the thickness of the pouch. Having a thin susceptor element in combination with a resiliently compressible material behind the susceptor element, between the inductor and the susceptor element, at least in the area of the triple point to be sealed, provides the advantage that the susceptor element may, and in operation is made to, temporarily deform when the first jaw and the second jaw are brought in their clamped position. Herein, the deformation is small, as it only acts to adapt the susceptor element to the thickness transition of the pouch walls at the triple point, in order to provide for evenly-distributed heat transfer from the susceptor element towards the pouch at the triple point. For example, the resiliently compressible material is a rubber, e.g. a silicone rubber or a polymeric material, such as Teflon.

In an embodiment, the jaw is provided with a single continuous susceptor element embodied as an inverted T-shaped plate with three elongated susceptor parts that are shaped as strips, e.g. of metal, having a thickness of between 0.08 and 0.8 mm, e.g. of between 0.08 and 0.5 mm. For example, the strip is made of aluminium material.

In embodiments, the frequency of the electric current supplied to the inductor is between 100 kHz and 1 MHz, for example between 250 KHz and 750 KHz.

In embodiments, the magnitude of the electric current supplied to the inductor is between 20 A and 600 A.

In embodiment, the electric current is supplied to the inductor at a voltage with a magnitude between 40 V and 500 V.

In an embodiment, a jaw is embodied such that the high frequency electromagnetic field generated by the inductor primarily causes the very rapid development of heat within a frontal skin layer of the susceptor element due to the so-called skin effect. The skin effect is the tendency of an alternating electric current to become distributed within a conductor such that the current density is largest near the surface of the conductor and decreases, exponentially, with greater depths of the conductor. At high frequencies the skin depth becomes smaller. This depth may, for example, be 0.15 mm for an aluminium susceptor element if the frequency of the field is 350 KHz. The thickness of the susceptor element is envisaged to be more than this skin depth, yet not too much for the reason addressed herein.

In an embodiment, the spacing between the rear of the susceptor element and the neighbouring inductor section(s) is at a minimum 0.025 mm, or 0.05 mm, or 0.1 mm and at a maximum 3.0 mm, or 2.0 mm, or 1.0 mm. The minimum values of this spacing are primarily envisaged to allow for effective electrical insulation between the inductor section(s) on the one hand and the susceptor element on the other hand. In embodiments, it is envisaged that this spacing is only filled with electrically insulating material. The maximum value of this spacing is primarily envisaged to have the inductor section(s) in close proximity to the rear of the susceptor element, wherein a maximum of 1.0 mm is preferred. In a practical embodiment this spacing may be 0.05 mm. So this spacing may in practical embodiments be less than the thickness of the susceptor element itself.

Preferably, the entire spacing between the rear of the susceptor element and the neighbouring inductor section(s) is filled with electrically insulating material.

In an embodiment, the spacing between the rear of the susceptor element and the neighbouring inductor section is filled with one or more layers of electrically insulating material, e.g. tape, for example at least a layer of Kapton tape and a layer of Teflon tape, for each just one layer of Kapton tape and one Layer of Teflon tape.

In an embodiment, the electrical insulation between the rear of the susceptor element and the neighbouring inductor section(s) has a thickness of between a minimum of 0.025 mm, or 0.050 mm, or 0.1 mm, and a maximum of at most 3.0 mm, or 2.0 mm.

In embodiments, in particular in embodiments of which a thickness of the susceptor element is small in comparison to the thickness of the inductor, the spacing in between the rear side of the susceptor element and the neighbouring inductor section(s) is filled with a resilient material, for example with an elastically deformable material, such as silicone rubber or Teflon. The resilient material may be able to deform in accordance with the thin susceptor element, in particular when the thin susceptor element is clamped against the triple point of the pouch, where the discrete transition is present in the thickness of the pouch. As known in the art of pouch production the triple point is where there are two walls to be joined on one side of the point, and wherein there are two pairs of two wall segments (so four wall thicknesses in total) to be joined on the other side of the triple point. See, for instance, WO2013/066328. The inductor is relatively thick and may not deform due to the clamping. The resilient material may compensate for this difference in deformability between the inductor and the susceptor element, and may provide that a contact pressure is constant over the entire front surface of the susceptor element and that the susceptor element evenly abuts the pouch walls. For example, in an embodiment, a silicone rubber layer or a Teflon layer is provided behind the susceptor element. For example, the resilient layer has a thickness between 0.1 and 2.0 millimeter. Herein it is understood that the thin susceptor element is able to flex so as to accommodate the local variation in the number of walls.

In an embodiment, the anti-stick layer at the front of the jaw is embodied as a layer of Teflon tape. In another embodiment, the anti-stick layer could comprises glass or the like.

In an embodiment the front face of the susceptor element is covered by a layer of Kapton tape, e.g. having a thickness of between 0.01 and 0.05 mm, e.g. of about 0.025 mm.

In an embodiment, the spacing between the front surface of the jaw and the susceptor element is at a minimum 0.025 mm, or 0.050 mm, and at a maximum 2.0 mm, or 1.0 mm, or 0.5 mm. Herein, the minimum spacing may be governed by the presence of an anti-stick layer. The anti-stick layer can be coated onto the jaw, e.g. onto the susceptor element, e.g. a glass or Teflon coating.

In an embodiment, the spacing between the front surface of the jaw and the susceptor element is filled with multiple layers of electrically insulating tape, for example at least a layer of Kapton tape and a layer of Teflon tape as anti-stick layer forming the front surface of the jaw, for each just one layer of Kapton tape and one Layer of Teflon tape.

In an embodiment, the front surface of the jaw is smooth in a region of contact with the walls of film material, so lacking any relief that would locally keep the film material away from the front surface, so lacking for example one or more ribs, bosses, etc. This arrangement is preferred in conjunction with the smooth design of the film material, in order to provide for a smooth region of contact.

In an embodiment, the jaws are configured, e.g. have appropriate dimensions, so that respective portion, e.g. at least halves of the bottom regions, of each of the two adjacent interconnected pouches are sealed in one cycle by the operation of the jaws. This avoids the needs for additional sealing actions at these portions of the bottom region, which is in particular favourable during the sealing of bottom gussets of standing collapsible pouches.

In an embodiment, the sealing device is configured to provide a heat impulse with the susceptor element of between at least 150° C. and at most any of 200° C., 300° C., 400° C., or 500° C., measured on the susceptor. It is noted that due to the, often, very short duration of the heat impulse and the highly dynamic changes of the temperature, directly measuring this temperature requires complex/expensive temperature measurement equipment. On the basis of the inputted electrical energy and analysis of heat flow/loss, the temperature that is achieved can be approximated.

In an embodiment, the heat impulse duration lies between 10 and 1000 milliseconds, e.g. between 20 and 500 milliseconds, e.g. between 75 and 400 milliseconds.

In an embodiment, the cycle includes a clamped cooling phase directly following the heat impulse during which the jaws are maintained in clamped position, which clamped cooling phase may have a duration between 200 and 800 milliseconds, e.g. between 300 and 600 milliseconds. In practical embodiments, the clamped cooling phase may be longer than the heat impulse as cooling is slowed down by the thermal insulating properties of plastic materials.

It is noted that control of the temperature that is reached during the impulse heating may be done on the basis of monitoring and controlling the supply of electrical power to the inductor and/or by monitoring and controlling the temperature and/or flow rate of cooling fluid, e.g. water, circulated along the respective jaws.

In an embodiment, at least one temperature sensor is provided that is configured to sense the actual temperature of a jaw, e.g. of a front surface of the jaw, e.g. of or near the susceptor element of the jaw, e.g. of the main body, which temperature sensor is linked to a control unit of the current source. Herein the control unit, e.g. computerized, is configured to adjust the current that is fed to the inductor on the basis of the output of the temperature sensor. For example, the current source is adjusted with respect to a preheating of the jaws and/or the impulse heating. Alternatively or additionally, the control unit, e.g. computerized, is configured to adjust the temperature and/or flow rate of cooling fluid circulated along the respective jaw on the basis of the output of the temperature sensor. For example, the cooling device is adjusted with respect to a preheating of the jaws and/or the impulse heating.

The controlling may take place via a feedback-type control mechanism, such that measured values during a first sealing cycle forms the basis for controlling the current source and/or cooling device, in order to influence the impulse heating and/or cooling for subsequent sealing cycles.

In an embodiment, the sealing device, e.g. a control unit thereof, is configured to effect a preheating of the susceptor element before the actual impulse heat sealing is carried out. For example, the susceptor element is preheated to a preheating temperature of between 50 and 120 degrees Celsius, e.g. between 60 and 80 degrees Celsius, before the heat impulse is carried out at a higher temperature of the susceptor element. The preheating may take place at a preheating temperature that is preferably low enough to prevent the film material to be significantly influenced. At the same time, the preheating reduces the difference in temperature between that of the susceptor, prior to the heat impulse, and the desired temperature of the susceptor during the heat impulse. The reduced temperature difference provides that the peak temperature during the heat impulse may be reached in less time and that the high frequency electromagnetic field only needs to be provided for a shorter period of time. As such, the required time for the heat sealing may be reduced, resulting in an increased production rate. Furthermore, the shorter heat impulse time may serve to avoid a risk of damaging the film material.

In a further embodiment, the sealing device, e.g. a control unit thereof, is configured to control a preheating of the susceptor element before the jaws are brought in the clamped position.

In an embodiment, the control unit may be configured to log during production of pouches, one or more sealing parameters in relation to the produced pouches, such as one or more actual settings of the current source and/or the cooling device, in order to be able to retrieve afterwards which seal of which pouch has been made at which specific setting(s). This may contribute to the monitoring of the quality of the seals in the pouches that are being made.

The production machine is primarily envisaged for production of pouches from metal-free film material. For example, the film material of the walls is a multi-layer material where one and the same plastic, but with different properties, is found in all layers. In another embodiment the wall is a monolayer wall. The absence of a metal layer allows for more effective recycling.

In an embodiment, the film material, preferably the metal-free film material, comprises one or more layers each comprising or consisting of polyethylene (PE), for example high-density polyethylene (HDPE) or low-density polyethylene (LDPE), and/or polypropylene (PP), and/or polyethylene terephthalate (PET). The film material may thereby comprise a mixture of two or more of these polymers, a laminate with one or more layers each consisting of one or more polymers, or a single layer with a single one of these polymers. These polymers may have different properties, for example in terms of mechanical strength and/or sealing capabilities, which may all be used to obtain a suitable material for the pouches.

In an embodiment, the film material is made entirely from polyethylene (PE), for example high-density polyethylene (HDPE) or low-density polyethylene (LDPE), polypropylene (PP), or polyethylene terephthalate (PET). According to this embodiment, the film material consists of a single type of polymer, e.g. a mono-material, which may optionally allow the film material to consist of a single polymeric layer. The use of only a single polymer may improve the recyclability of the pouch, since it may no longer be required to separate the various polymers, since the pouch wall only comprises a single polymer. Also any metal layer is absent.

In an embodiment, the film material includes a layer of Ethylene vinyl alcohol (EVOH) as an oxygen barrier, e.g. for food packaging, e.g. as a substitute for a metal layer in the film which is preferably absent. A film material with a single type of polymer as defined above may still comprise a certain amount of EVOH, typically up to 5 wt %, whilst still being characterized as a mono-material.

It is noted that in embodiments, the single polymer type film material may comprises multiple layers of the same polymer, yet the layers having differences in composition and/or properties, e.g. due to the layer being oriented. In view of recycling, it may be allowable to have a minimal amount of another polymer in the pouch walls, e.g. an EVOH layer for barrier properties, e.g. as substitute for a metal layer in the film material.

In an embodiment, the film material is printed, e.g. a surface print being provided on the side that is contacted by a jaw of the sealing station having a susceptor and inductor. The impulse sealing does not impair the quality of the surface print in contrast to the use of continuously heated seal jaws. In an embodiment, the film material is subjected to inline surface printing of the film material, e.g. just prior to the sealing as disclosed herein.

In an embodiment, the production machine is embodied with a conveyance mechanism that is configured to convey the string of interconnected pouches along a path of conveyance, wherein the sealing station as discussed herein is arranged along said path of conveyance. In an embodiment, the conveyance mechanism is configured and operated to convey in an intermittent motion pattern, so stepwise. Often a so-called walking beam conveyance mechanism is employed for stepwise conveyance. The sealing action is then performed with the string of pouches at rest, in practical embodiments with the sealing station mounted stationary in the machine, at least with regards to the direction of conveyance.

In another, preferred, embodiment, the conveyance mechanism is configured and operated to convey the string of interconnected pouches along a path of conveyance in a continuous motion, so without stopping and starting, preferably at a constant speed. Herein it is envisaged that the sealing station comprises a motion device that allows to and is operated to move a pair of jaws in synchronicity with the continuously moving pouch or string of pouches during the impulse sealing cycle. An advantage of this approach is that undesirable deformations of the pouch are avoided, e.g. local stretching, which would otherwise result from rapid stopping and starting. For example, the sealing station comprises an endless motion device wherein one or more, preferably multiple, sealing devices are moved along an endless path that extends over a segment thereof along the path of conveyance. In another example, the motion device is embodied to reciprocate the sealing device in a direction parallel to the path of conveyance. In the continuous motion conveyance variant it is preferred for the cooling device to be embodied such that a continuous circulation of coolant through the one or more cooling ducts in the jaws can be established. In an embodiment wherein the jaw is moved along an endless track, this may entail the use of one or more rotary couplings to connected, for example, one or more hoses connected to the jaws via the one or more rotary couplings to a stationary mounted pumping and heat exchanger system. In a reciprocating design, it may suffice to have one or more flexible cooling ducts between the jaws on the one hand and a stationary mounted pumping and heat exchanger system.

In an embodiment, the machine comprises one or more of:
- a roll handling station adapted to receive one or more rolls of heat-sealable film material,
- one or more pouch forming stations adapted and operated to form the film material dispensed by the roll handling station into a succession of pouches, e.g. a string of interconnected pouches, each pouch optionally having at least one bottom gusset at its bottom region, being formed by two folded bottom lobes below a triple point of the pouch.
- for example a pouch forming station being embodied as a folding station, e.g. to fold film material dispensed from a single roll into a shape of a pouch, comprising two pouch walls and optionally with a bottom gusset,
- for example a pouch forming station being embodied as a cutting station, e.g. to make one or more cuts to shape and/or separate, e.g. in part, the pouches, for example a sealing station as discussed herein, a feed mechanism adapted and operated to feed said formed pouches, e.g. as a string of interconnected pouches, to the sealing device, which devices may be located at one at the same station.

The machine is configured for production of collapsible pouches, preferably for the production of standing collapsible pouches with one or more gussets, e.g. in a side and/or in a bottom of the pouch.

In embodiments, the machine comprises a filling station, configured to fill a product into the pouch.

In an embodiment, the filling station is configured to fill the product into the pouch prior to the sealing of a spout to the pouch. The filling can then, for example, be performed via a non-bonded edge region at the top of the pouch into which the spout is sealed at a later stage.

In an embodiment, the filling of the pouch on the production machine is done after performing the impulse sealing cycle at the mentioned station, e.g. after sealing the bottom region of the pouch and after sealing a spout in between the pouch walls. For example, the filling is done via the spout, e.g. in an aseptic filling device, optionally followed by a closing step wherein the spout is closed, e.g. in a capping station provided with a capping device configured and operated to place a cap on the spout.

In an embodiment, all sealing devices of the production machine, including the sealing device as discussed herein, are located at one and the same station of the production machine. For example, the sealing devices acting in succession to provide the various seals without the film material being moved relative to the sealing devices during the entirety of the various sealing steps. In an embodiment, all said sealing devices are arranged in one sterile or aseptic chamber of the production machine.

The present invention also relates to a method for the production of collapsible pouches, preferably collapsible standing pouches comprising a bottom gusset, wherein use is made of a production machine as described herein.

Figure 2:
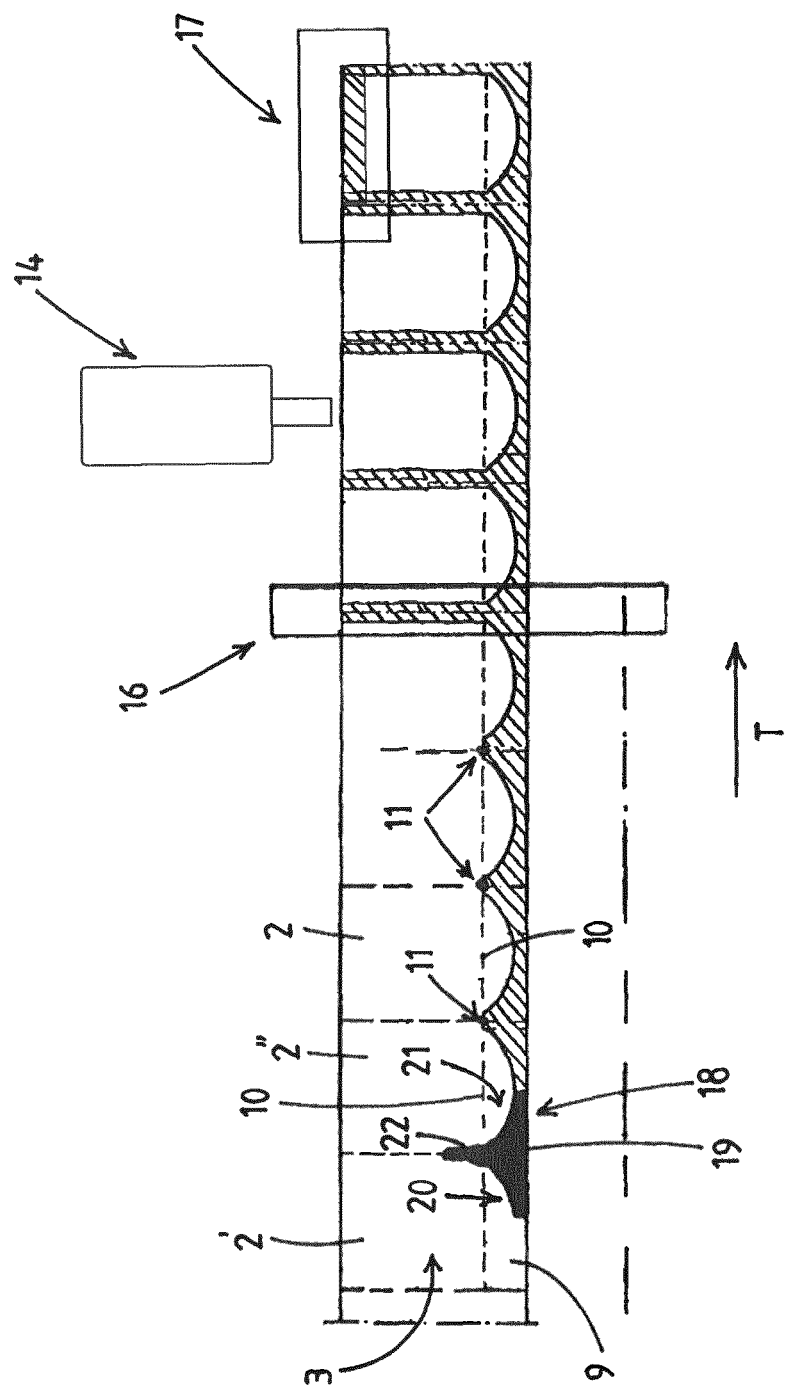
Figures 3, 4:
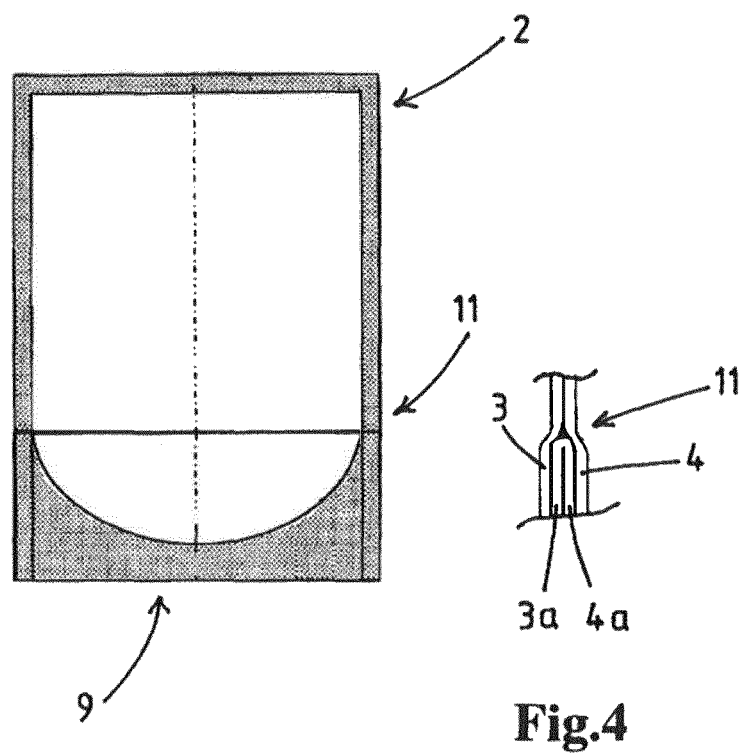
Figure 5:
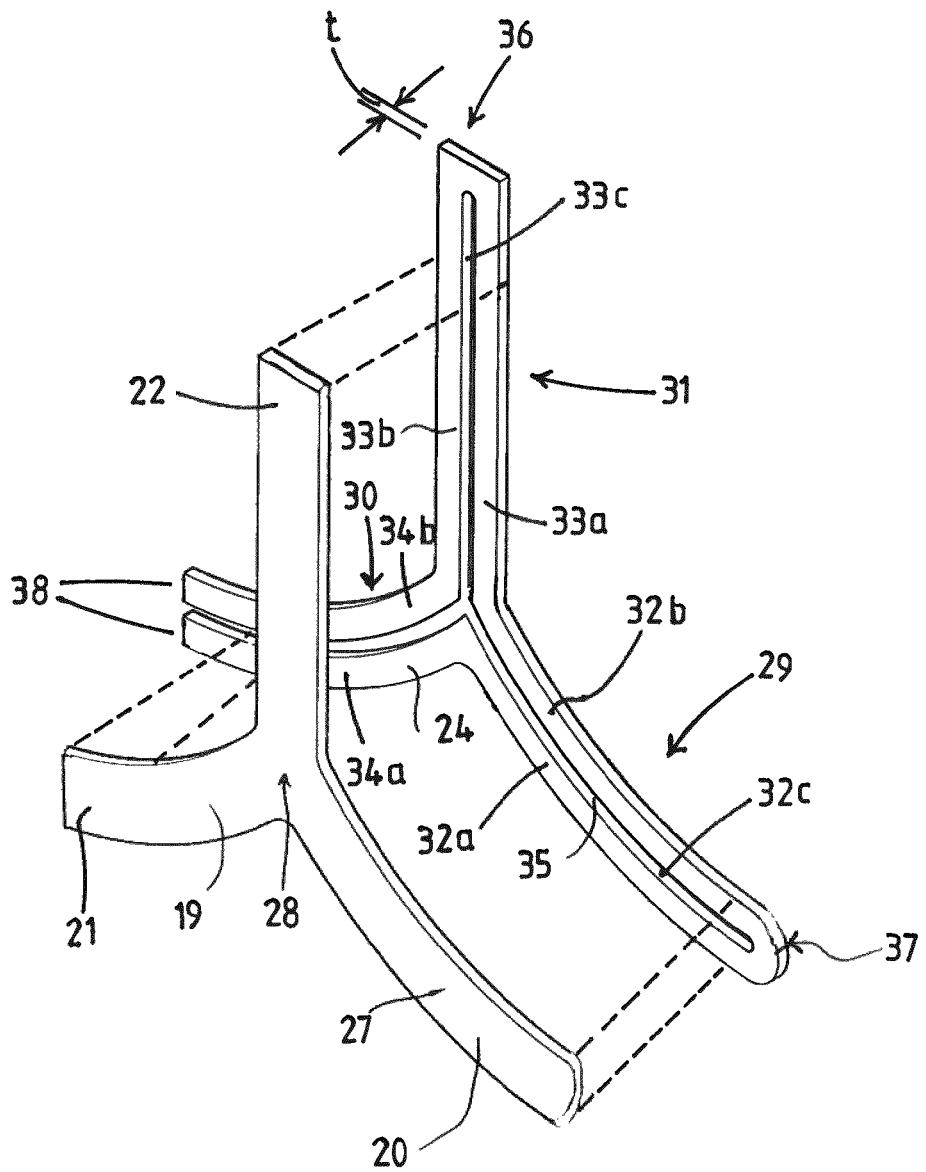
Figure 6:
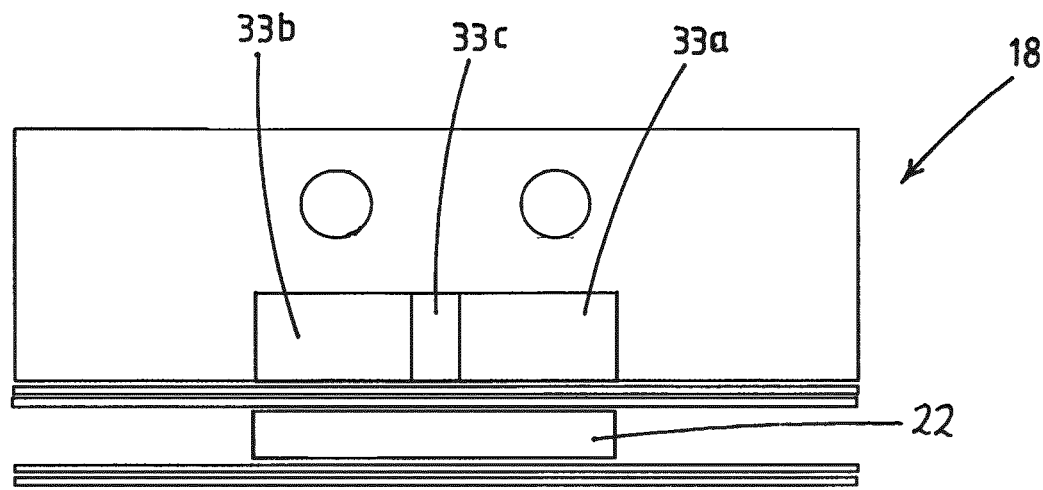
Figure 7:
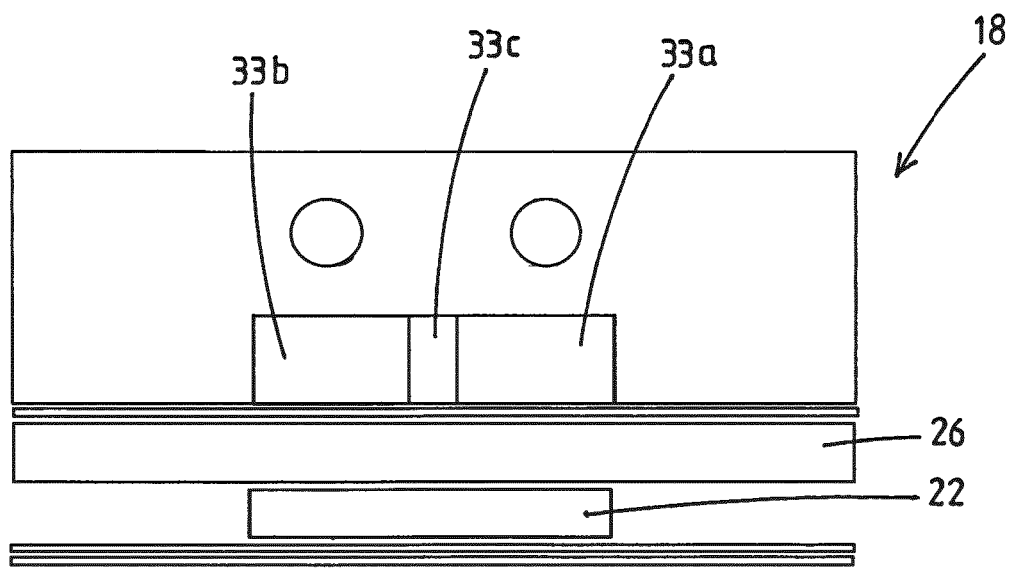
Figure 8:
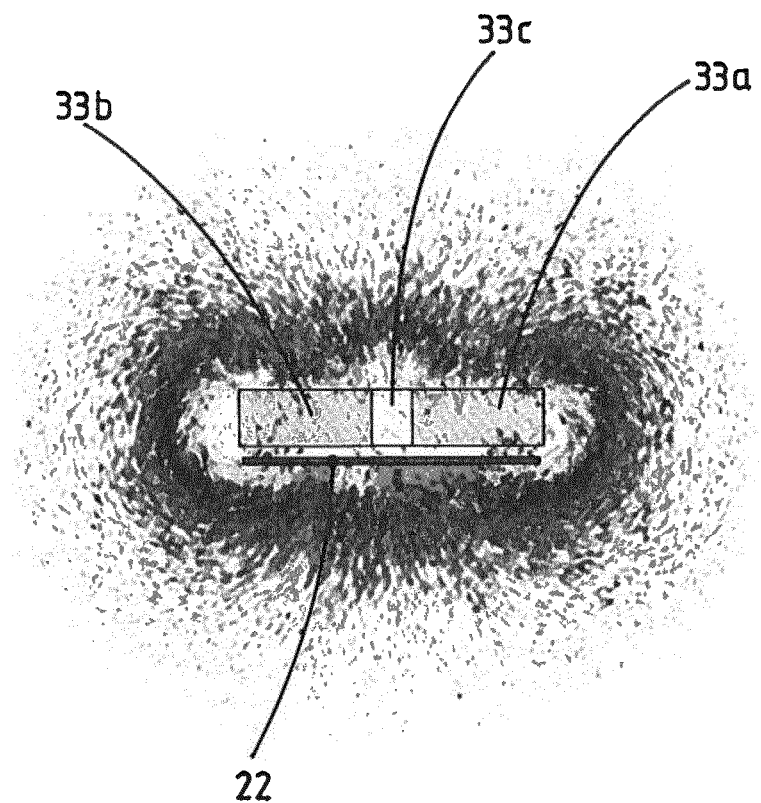
Figure 11:
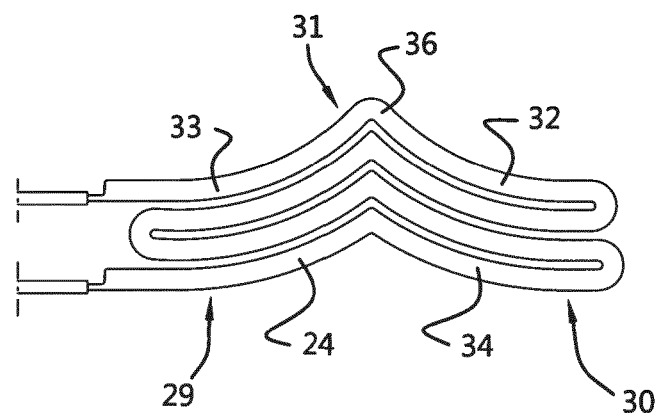
Figure 12:
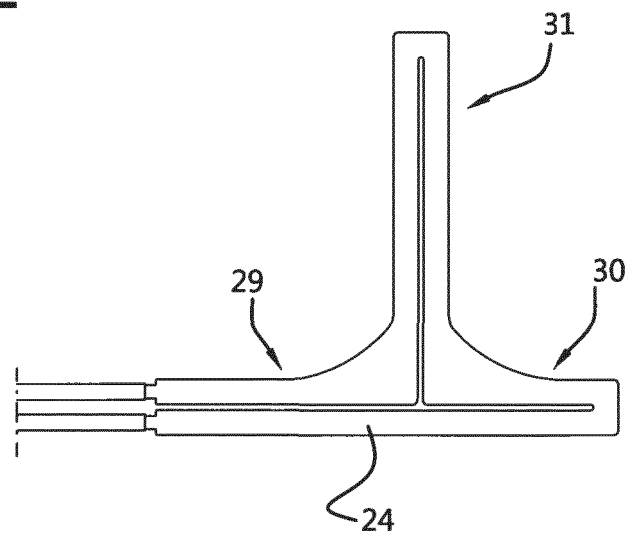
Figure 13:
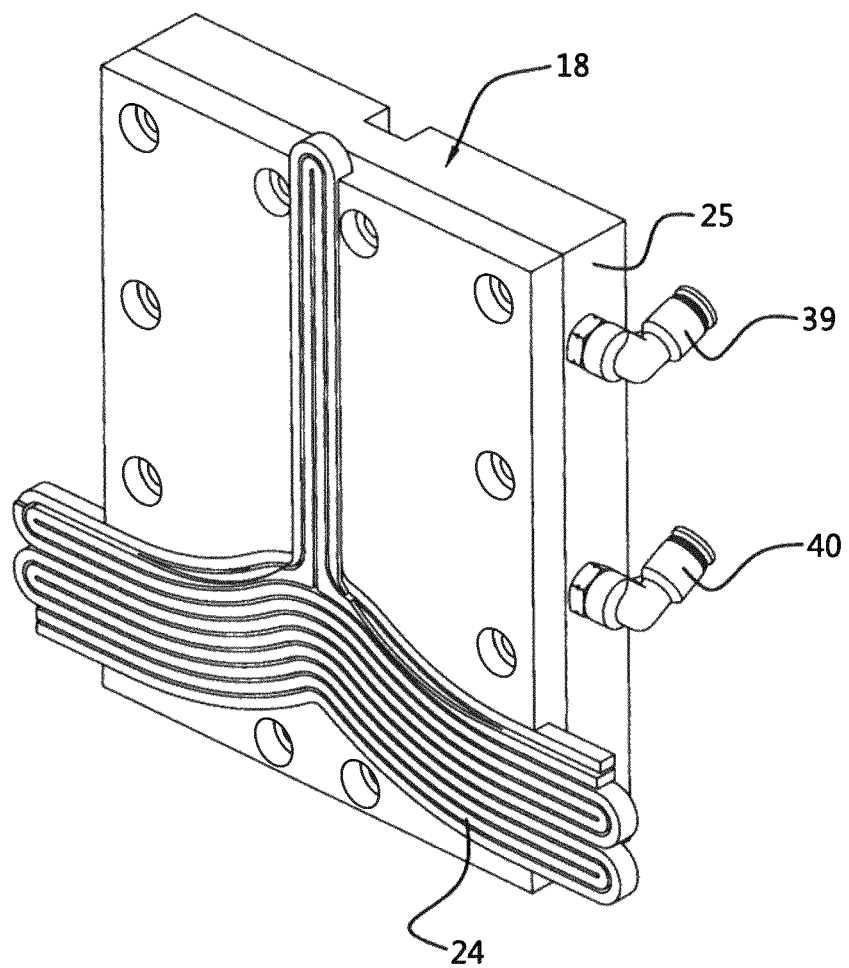
Figure 14:
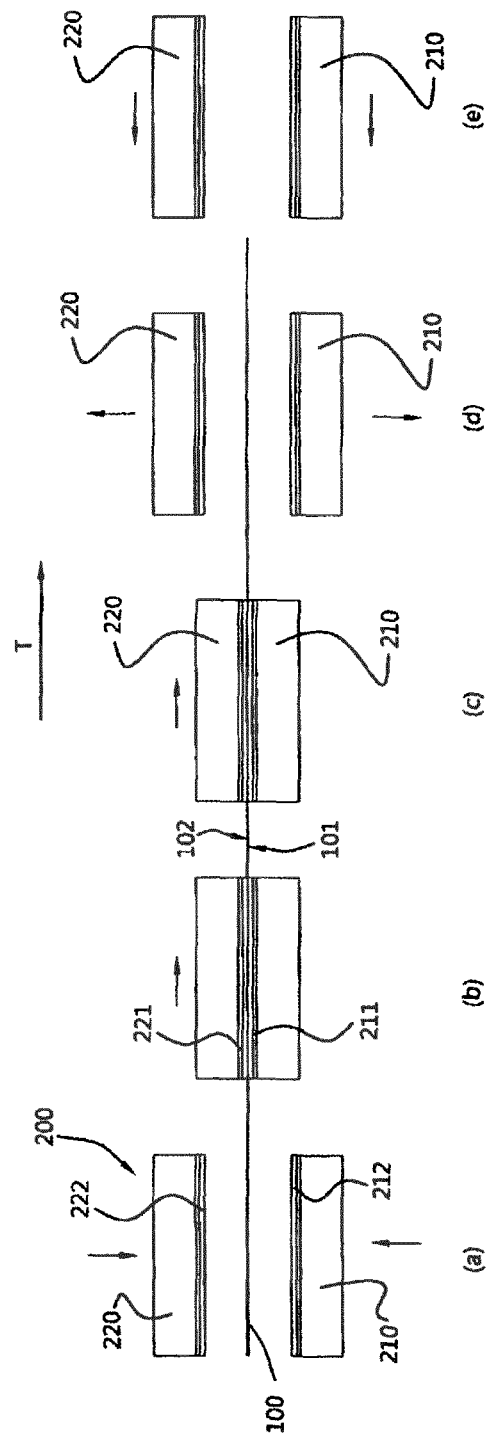

Embodiments of the pouch production system and method will be described by way of example only, with reference to the accompanying drawings in which reference symbols indicate corresponding parts, and in which:

FIG. 1 schematically shows an embodiment of the production machine according the invention, FIG. 2 illustrates schematically the sealing stations in the machine of FIG. 1, FIG. 3 illustrates a standing pouch produced with the machine of FIG. 1, FIG. 4 illustrates a triple point in the pouch of FIG. 3, FIG. 5 schematically depicts an inverted T-shaped susceptor element and corresponding inductor, FIG. 6 illustrates a cross-section through an elongated part of an inverted T-shaped inductor, FIG. 7 illustrates a cross-section through an elongated part of an inverted T-shaped inductor, wherein a resilient layer is provided between the susceptor and the inductor, FIG. 8 illustrates the electromagnetic field generated by an elongated part of the inverted T-shaped inductor and the susceptor element in said field, FIGS. 9, 10, 11, 12 depict various embodiments of an inductor, FIG. 13 depicts an embodiment of a first jaw of the gusset sealing device of FIG. 2, and FIG. 14 illustrates schematically the operation of the sealing station in a continuous motion embodiment.

FIG. 1 schematically depicts an embodiment of the production machine for the production of collapsible standing pouches, to which is referred with reference numeral 1. The machine is also known a Form-Fill-Seal (FFS) machine, in particular in the depicted embodiment a horizontal FFS machine.

The pouch production machine 1 is configured to produce collapsible pouches 2, here standing collapsible pouches, that are filled with a product. In the depicted example the top edge is sealed over its length. In an alternative embodiment a plastic spout or other fitment is sealed into the top edge.

The pouches 2 each have opposed walls 3, 4 that are made from metal-free heat-sealable film material 5.

The pouch production machine 1 has a frame (not shown) provided with a film supply device 6 that is adapted to receive one or more rolls 7 of flexible heat-sealable film material 5. In the machine 1, the film material is unwound from the roll 7.

After unwinding, the film material 5 is led towards a bottom gusset folding device 8 to fold the film material dispensed from a single roll into a folded shape, so that two pouch walls 3,4 oppose one another and so that the bottom has a gusset as is well known in the art.

Up till the moment of separation of a complete pouch 2, there is a string of interconnected pouches that are being formed in the machine. In this embodiment, these pouches, whilst still interconnected in a string, are also filled and then sealed hermetically. In another design, the pouches are separated from the string whilst still empty, e.g. for later filling by a downstream filling station or at a remote location.

In FIG. 1, the individual pouches 2 in the string are displayed separated by means of the dashed lines in between them.

Each pouch 2 has a bottom gusset 9 with first and second gusset portions at its lower end.

In between the first pouch wall 3 and the second pouch wall 4, the first and second gusset portions are interconnected along a fold line 10.

At their respective side edges or vertical seams, the pouches 2 have a triple point 11 at the height of the fold line 10.

The machine 1 further comprises a cutting station 12, which is configured to make one or more cuts to shape and/or separate, e.g. in part, the pouches 2.

A feed mechanism is provided, here being formed by a set of traction rolls 13, which is adapted and operated to unwind the roll 7 and to feed said string of interconnected pouches 2 along the sealing devices at stations 15, 16.

Furthermore, a filling station 14 is provided, which is configured to fill a product into the pouch 2.

The production machine 1 comprises a sealing station that is configured to heat seal the pouches. The sealing station comprises a gusset sealing device 15 for sealing, in a cycle, bottom gusset regions 9 of two adjacent pouches 2 in a string of interconnected pouches 2. The bottom sealing device 15 is configured to heat seal the pouch in the region of the gusset, e.g. to make a heat seal between the first pouch wall and the first gusset portion that is directly inward thereof and a heat seal between the second pouch wall and the second gusset portion that is directly inward thereof.

Downstream of the gusset sealing device 15, along transportation direction (T), the sealing station comprises a side edge or side seam sealing device 16 for sealing side edges of two adjacent pouches 2 in a string of interconnected pouches 2.

Further downstream, the sealing station comprises a top edge sealing device 17 for sealing top edges of the pouches 2, here after filling the pouches at filling station 14 via the still open top edge.

In FIG. 1, a single jaw 18 of the gusset sealing device 15 is displayed. This first jaw 18 faces towards the bottom gusset 9 on the first side wall 3. On the opposite side of the string of interconnected pouches 2, the gusset sealing device 15 comprises a second jaw, which faces the towards the bottom gusset 9 on the second side wall 4.

The gusset sealing device 15 is provided with an actuator device 15a, configured to move the first jaw 18 and second jaws relative to one another between an opened position and a clamped position.

The gusset sealing device 15 further comprises a cooling device 20 configured to cool each of the first jaw 18 and second jaw.

In FIG. 2, the sealing actions of the machine 1 are shown schematically.

The first jaw 18 of the bottom sealing device 15 comprises a susceptor element 19, which has a front surface that is at least shaped as an inverted T.

In FIG. 2, an exemplary contour of the susceptor element 19 is displayed. The front surface of the susceptor element is positioned against the first pouch wall 3 in the clamped position. On the opposite side of the string of interconnected pouches 2, a similar susceptor element of the second jaw is positioned against the second pouch wall 4.

During operation of the machine 1 in a sealing cycle, as in the configuration in FIG. 2, the susceptor element 19 projects partially over bottom gusset regions 9 of two adjacent interconnected pouches 2.

A vertical centreline of the susceptor element 19 is thereby aligned with a separation line between side edges of the two adjacent pouches 2. The susceptor element 19 thereby projects halfway over a first pouch 2 with a first elongated susceptor part 20 and projects halfway over a second pouch 2" with a second elongated susceptor part 21.

The susceptor element 19 further comprises an upward oriented elongated susceptor part 22, which projects towards a top end of the pouches 2 and projects over the side edges of the two adjacent interconnected pouches 2', 2", at least over a lower portion of said side edges. In operation, this upward elongate susceptor part 22 thereby at least partially seals the side edges of the adjacent interconnected pouches.

The first elongate susceptor part 20 and the second elongate susceptor part 21, together with the upward susceptor part 22, form a susceptor element 19 that has the shape of an inverted T. As shown by way of example, the three elongate susceptor parts 20, 21, 22 of the susceptor element 19 are shaped with a curvature between each sideways oriented susceptor part and the upward oriented susceptor part to form a rounded corner seal. By having an inverted T-shaped susceptor element 19, gusset sealing device 15 simultaneously seals a part of a bottom gusset 9 of the first pouch 2' and seals a part of bottom gusset 9 of the second pouch 2".

The susceptor element 19 further projects over the triple points 11 of the adjacent pouches 2, which are located at the height of the folding line 10.

At this triple point 11, a heat seal is made by first jaw 15 between the first pouch wall 3 and the first gusset portion 3a that is directly inward thereof and a heat seal is made by the second jaw between the second pouch wall 4 and the second gusset portion 4a that is directly inward thereof. So at point 11, a discrete transition in thickness of the pouch 2 occurs between the upper-two-layers and the lower-four-layers of film material 5.

The gusset sealing device 15 further comprises an inductor 24 in the first jaw 18, not shown in FIGS. 1 and 2. The inductor 24 is electrically insulated from the susceptor element 19 and comprises an elongated inductor section that extends along the respective front surface and at the rear side of the susceptor element 19.

In operation, an electric current source is operated to temporarily feed a high frequency alternating electric current to the inductor 24, thereby generating a high frequency electromagnetic field with the inductor 24, wherein the high frequency electromagnetic field induces alternating eddy currents in the susceptor element 19.

The eddy currents generate an impulse of heat that is emitted by the susceptor element 19, which impulse of heat seal the bottom region of pouch wall 3 to the adjoining gusset portion 3a. The same holds true for the other jaw.

In FIGS. 3A and 3B, a cross-section of the first jaw 18 is displayed, being disposed in the clamped positon against the first pouch wall 3. The first jaw 18 comprises a main body 25 that is provided with one or more cooling fluid ducts. The cooling fluid is a cooling liquid, such as water, being passed through the cooling fluid ducts, for example by means using a pump assembly. A cooling liquid circuit is provided, which is a closed circuit including a heat exchanger configured to remove heat from the cooling liquid.

The thickness of the susceptor element 19 is small in comparison to the thickness of the inductor 24. A spacing is present between the susceptor element 19 and the inductor 24, which is filled with an electric insulator 26, in order to prevent short-circuiting between both during operation of the gusset sealing device 15. The insulator 26 is made from a resilient material, for example from an elastically deformable material, such as silicone rubber and/or Teflon. The resilient material enables deformation of the insulator 26, in accordance with deformation of the thin susceptor element 19.

This deformation is in particular advantageous when the thin susceptor element 19 is clamped against the triple point 11 of the pouch 2, as displayed in FIG. 3B. where the discrete transition is present in the thickness of the pouch 2. The inductor 24 is relatively thick and will not deform in the clamped position, whereas the thin susceptor element 19 will deform against the first pouch wall 3 at the triple point 11. The resilient material of the insulator 26 will compensate for this difference in deformability between the inductor 24 and the susceptor element 19, and provides that a contact pressure is constant over the entire front surface of the susceptor element 19 and that the susceptor element 19 evenly abuts the first pouch wall 3.

In FIG. 5, an embodiment of the susceptor element 19 and the inductor 24 is displayed. The susceptor element 19 is shown spaced from the inductor 24, in order to show the shape of the inductor 24.

During operation of the gusset sealing device 15, a front surface 27 of the susceptor element 19 is very close to a wall of the pouch. The inductor 24 faces an opposing rear side of the susceptor element 19.

The front surface of the susceptor element 19 has the shape of an inverted T, i.e. an upside-down T.

The susceptor element 19 comprises three elongate susceptor parts 20, 21, 22, which are interconnected at a central portion 28 of the susceptor element 19.

In operation, the upward elongate susceptor part 22 projects towards a top end of the pouch. The first elongate susceptor part 20 and the second elongate susceptor part 21 are aligned in opposite directions with a component that projects away sideways from the upward elongate susceptor part 22, e.g. being aligned in sideways, downward directions.

The susceptor element 19 is embodied as a continuous inverted T-shape with three elongated susceptor parts 20, 21, 22 that are each shaped as an elongated strip.

The inductor 24 comprises multiple elongated inductor parts, e.g. three elongated inductor parts that are serially connected at a central portion of the inductor 24. A first elongated inductor part 29 thereby projects over the first elongate susceptor part 20. A second elongated inductor part 30 thereby projects over the second elongate susceptor part 21. Furthermore, a third elongated inductor part 31 projects over the upward elongate susceptor part 22. As such, the shape of the inductor 24 substantially corresponds to the shape of the susceptor element 19, in order to provide an even distribution of eddy currents in the susceptor element 19 during operation of the gusset sealing device 15.

The inductor 24 comprises three groups, here pairs, of adjacent elongated inductor sections 32a,b, 33a,b, 34a,b.

A first group, here pair, of elongated inductor sections 32a,b forms the upward elongated inductor part 31.

A second group, here pair, of elongated inductor sections 33a, b the second elongated inductor part 30.

The elongated inductor sections 32a,b, 33a,b, 34a,b extend pairwise parallel to one another and spaced from one another by a slit 35, thereby following the inverted T-shape of the susceptor element 19.

They are arranged in proximity of the rear side of the susceptor element 19.

The slit 35 in the inverted T-shaped inductor 24 projects onto the inverted T-shaped susceptor element 19, in order to provide a homogeneous high frequency electromagnetic field of the field, thereby contributing to the homogeneity of the impulse heating of the susceptor element 19.

The elongated inductor sections 33a,b are connected via a bend 36. The elongated inductor sections 32a,b via a bend 37. The inductor sections 34a,b have terminals for electrical connection to the current source. The bend 36, the bend 37 and the free ends 38 project outside the contour of the susceptor element 19.

It is shown in FIGS. 5 and 8, that a jaw is embodied such that the high frequency electromagnetic field generated by the inductor part 33 primarily causes the very rapid development of heat within a frontal skin layer of the susceptor element due to the so-called skin effect. The skin effect is the tendency of an alternating electric current to become distributed within a conductor such that the current density is largest near the surface of the conductor and decreases, exponentially, with greater depths of the conductor. At high frequencies the skin depth becomes smaller. This depth may, for example, be 0.15 mm for an aluminium susceptor element if the frequency of the field is 350 KHz. The thickness of the susceptor element is envisaged to be more than this skin depth, yet not too much for the reason addressed herein.

Figure 9:
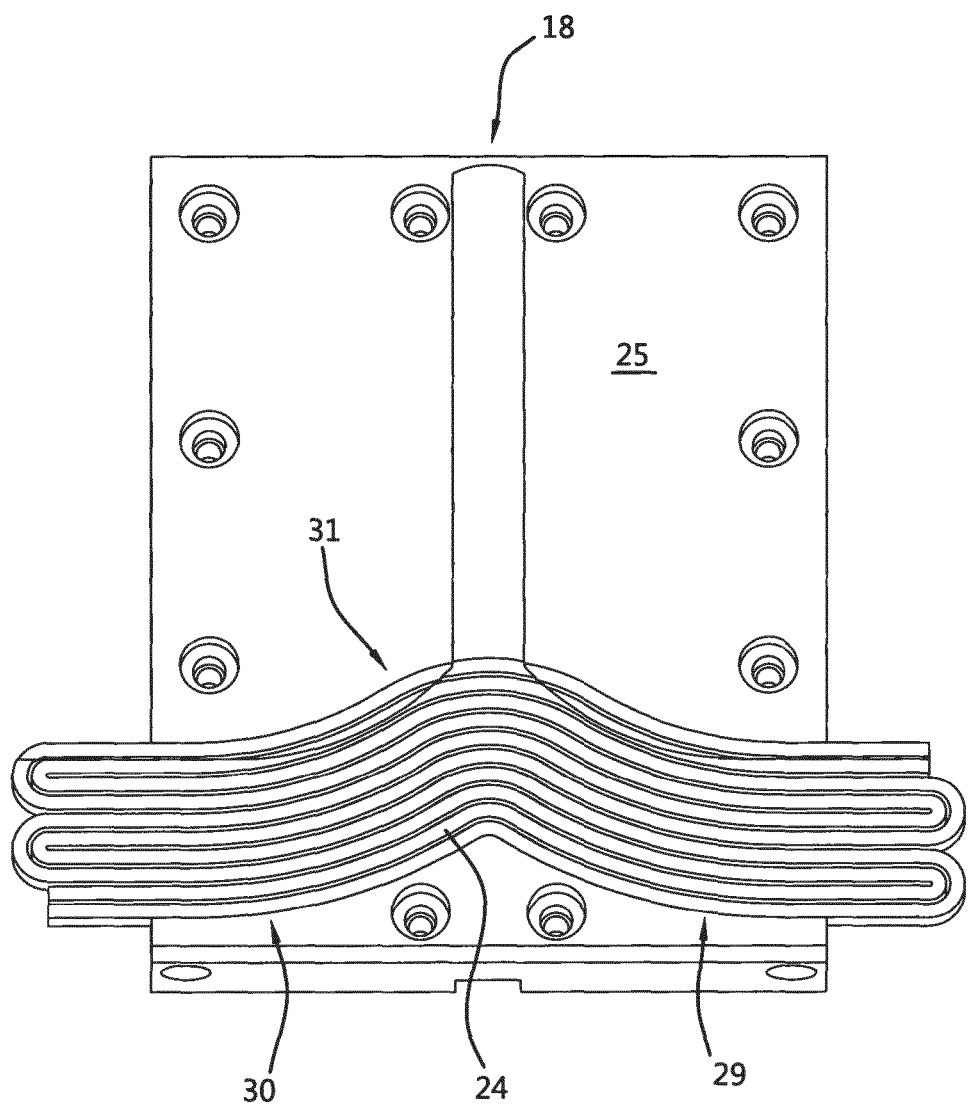

FIG. 9 depicts an alternative embodiment of the inductor 24, being embedded in the main body 25 of the first jaw 18. This inductor 24 is relatively wide, compared to its height. The first elongate inductor part 29 and the second elongate inductor part 30 of the inverted T-shaped inductor 24 have a length that is substantially larger than the length of the upward elongate inductor part 31. As such, this inductor 24 is in particular suited to weld pouches with a relatively low bottom gusset, of which the triple point is located at a relatively low portion of the pouch.

Figure 10:
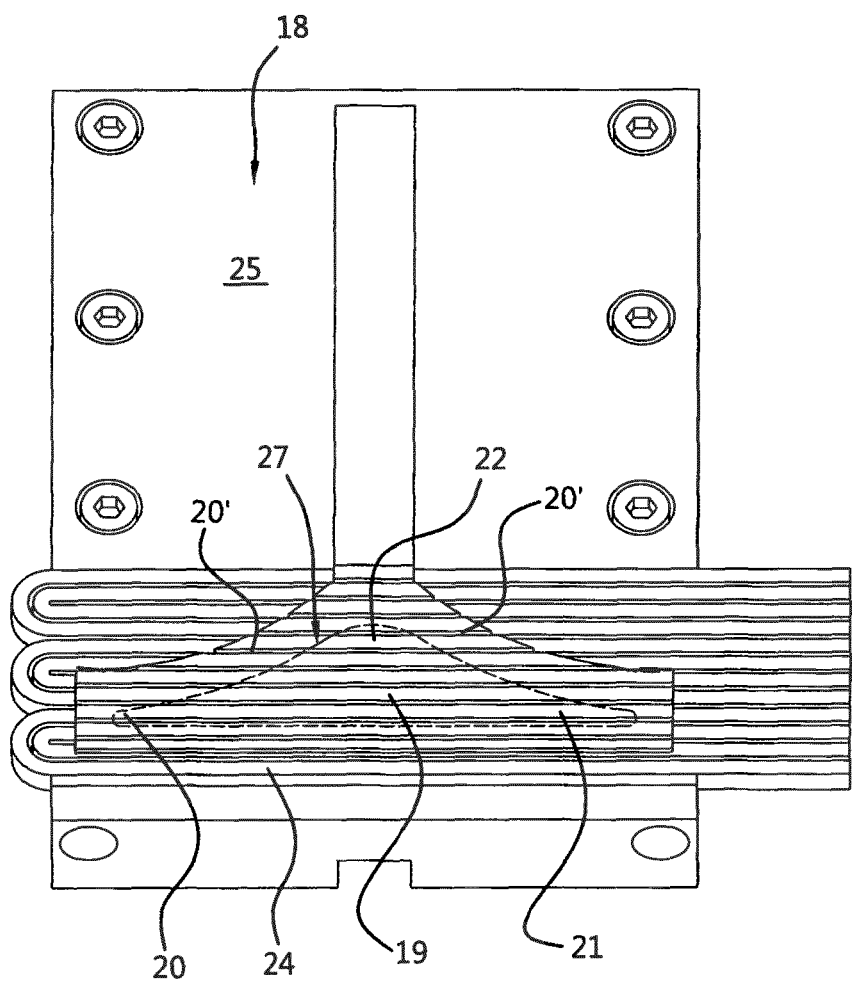

In FIG. 10, a further alternative embodiment of the inductor 24 is displayed, being embedded in the main body 25 of the first jaw 18 as well. This inductor 24 comprises a plurality of parallel inductor sections, each being separated from an adjacent one by a slit. On top of the inductor 24, a susceptor element 19 is arranged. The susceptor element 19 has a front surface 27 with the shape of an inverted T, comprising three elongate susceptor parts 20, 21, 22, of which a first elongate susceptor part 20 and a second elongate susceptor part 21 extend substantially sideways in opposite directions. An upward elongate susceptor part 22, extends upwards, projecting towards a top end of the pouches that are to be sealed.

In between the first elongate susceptor part 20 and the upward elongate susceptor part 22, the susceptor element 19 comprises a first intermediate susceptor part 20', in order to form a smooth transition in geometry between the first elongate susceptor part 20 and the upward elongate susceptor part 22. In between the second elongate susceptor part 21 and the upward elongate susceptor part 22, the susceptor element 19 comprises a second intermediate susceptor part 21', in order to form a smooth transition in geometry between the second elongate susceptor part 21 and the upward elongate susceptor part 22.

FIG. 11 depicts a further alternative embodiment of the inductor 24. This inductor 24 is relatively wide, compared to its height. The first elongate inductor part 29 and the second elongate inductor part 30 of the inverted T-shaped inductor 24 have a relative smooth transition into the upward inductor part 31 of the inductor 24. At the upward inductor part 31, a relatively sharp first bend 36 is provided between the first elongated inductor section 32 and the second elongated inductor section 33, in order to optimize the geometry of the inductor 24 for achieving a substantially homogeneous high-frequency electromagnetic field during use.

In FIG. 12 another embodiment of the inductor 24 is displayed. This inductor 24 is relatively narrow, compared to its height. The first elongate inductor part 29 and the second elongate inductor part 30 of the inverted T-shaped inductor 24 have a length that is substantially smaller than the length of the upward elongate inductor part 31. As such, this inductor 24 is in particular suited to weld pouches that are relatively narrow, compared to their height. Furthermore, this embodiment of the inductor 24 allows simultaneous sealing of bottom gussets of two adjacent interconnector pouches, with the first elongate inductor part 29 and the second elongate inductor part 30 that extend in opposite sideways directions, and sealing of complete side edges of the two adjacent interconnector pouches over their entire height from their bottom ends to their top ends.

In FIG. 13, an embodiment of the first jaw 18 is displayed in more detail. The first jaw 18 has the inductor 24 embedded in its main body 25. The jaw 18 is provided with a cooling fluid duct in the main body 25. Within the main body 25, the cooling liquid is passed in close proximity to the inductor 24, e.g. directly behind it. The jaw 18 further comprises a cooling fluid entrance port 39 and a cooling fluid exit port 40 protruding from the main body 25, configured to be connected to a cooling liquid circuit with a pump assembly and a heat exchanger configured to remove heat from the cooling liquid exiting the jaw 18.

In FIG. 14, the embodiment of the production machine comprising a sealing station as discussed herein and provided with a motion device is illustrated. Herein the motion device is configured to move the first and second jaws 210, 220 in synchronicity with the continuously moving string of pouches during the impulse sealing cycle. The operation is displayed schematically by means of steps (a)-(e).

In the displayed embodiment, the sealing device 200 comprises a first jaw 210 and a second jaw 220. During the production of the pouches, the string of interconnected pouches to be formed and having first and second walls 101, 102 is moved continuously, preferably at constant speed, in a transportation direction (T), from left to right in FIG. 14.

The motion device of the sealing station device 200 is configured to move the jaws 210, 220 along with the pouch walls 101, 102 in the transportation direction (T), at least during the sealing cycle.

The cycle is started with step (a), shown on the left side of FIG. 14. The first jaw 210 and the second jaw 220 are initially in a position spaced from the bottom regions of the pouch walls 101, 102.

Upon operation of the first actuator device 201, the first jaw 210 is moved towards its clamped position, wherein the first jaw 210 comes in contact with the first pouch wall 101 as discussed herein. Similarly, the second jaw 220 is moved towards its clamped position by the second actuator device 202, wherein the second jaw 220 comes in contact with the second pouch wall 102 as discussed herein. In the respective clamped positions, the first pouch wall 101 and the second pouch wall 102 are lightly clamped onto one another in the region of the seal to be formed. The clamping is lightly as no significant pressure is involved in the sealing process.

Next, during step (b), the jaws 210, 220 remain in their respective clamped positions and move along with the continuously advanced interconnected string of pouches. Step (b) is an impulse sealing step, during which an electromagnetic field is created by the first inductor 211 and/or in the second inductor 221, in order to induce respective heat impulses in the first susceptor 212 and/or in the second susceptor 222.

Under the influence of the heat impulses, the first pouch wall 101 and the second pouch wall 102 are locally fused in their bottom regions. For example directly onto one another when no bottom gusset is present. Or onto a neighbouring gusset portion, when a bottom gusset type pouch is produced.

During step (c), the one or more heat impulses are no longer provided as the one or more inductors are no longer energized, but the jaws 210, 220 remain in their clamped positions. Cooling fluid is being circulated through the ducts in the one or more jaws 210, 220. Preferably, this supply of cooling fluid is continued during all steps (a)-(e) of the sealing cycle. Accordingly, heat is removed from the welded zones of the pouch 100 as well.

During step (d), the first jaw 210 and the second jaw 220 are moved away from each other, into the opened position. Upon moving them away from each other, the jaws 210, 220 again become spaced from one another.

Finally, during step (e), the first jaw 210 and the second jaw 220 are moved back towards their initial position. This movement may take place in a direction opposite to the transportation direction (T), in order to effect that the jaws 210, 220 become arranged in their initial positions, similar as on the onset of step (a).

After moving the jaws 210, 220 back during step (e), the cycle is repeated, starting with step (a) again.

It will be appreciated that the path of the jaws 210, 220 can be of any suitable shape, e.g. circular, oval, linear, etc.

The invention claimed is:

1. A production machine for the production of collapsible pouches, said pouches each having walls made from heat-sealable film material wherein the production machine comprises a sealing station that is configured to heat seal bottom regions of two adjacent pouches in a string of interconnected pouches made from heat-sealable film material, wherein the sealing station comprises:
an impulse sealing device comprising a first jaw and a second jaw,
an actuator device configured to move the first and second jaws relative to one another between an opened position and a clamped position,
a cooling device configured to cool at least one of the first and second jaws,
wherein the first jaw has a first front surface configured to contact bottom regions of a respective first wall of two adjacent pouches,
wherein the second jaw has a second front surface configured to contact the bottom regions of a respective second wall of the two adjacent pouches,
wherein at least one of the first and second jaws comprises at the respective front surface thereof at least one impulse heatable member that extends along the front surface and that is covered by a heat-resistant non-stick covering,
wherein the production machine is configured such that, in operation, the string of interconnected pouches is positioned in between the first and second jaws and such that the impulse heatable members project each at least partially over the bottom regions of two adjacent interconnected pouches,
wherein the cooling device comprises one or more cooling ducts in said at least one of the first and second jaws of each sealing station,
wherein the one or more cooling ducts are arranged at a rear side of the inductor,
wherein the cooling device is configured to establish a continuous circulation of liquid coolant through the one or more cooling ducts,
and wherein the sealing station is configured to perform an impulse sealing cycle, wherein the actuator device is configured to bring the first and second jaws into the clamped position, so that—in the bottom regions—the first and second walls are clamped against one another by the front surfaces of the first and second jaws, and wherein the sealing station is configured to, in the clamped position, temporarily energize the one or more impulse heatable members so as to generate an impulse of heat that is emitted by each of the impulse heatable members, wherein the first and second jaws, at least the one or more impulse heatable members thereof, cool down after termination of the energizing assisted therein by operation of the cooling device, and wherein the actuator device is configured to move the first and second jaws into the opened position after the one or more impulse heatable members have cooled down,
wherein each impulse heatable member is a susceptor element comprising electrically conductive material, said susceptor element having a rear side facing away from the respective front surface,
wherein each of the susceptor elements has a front surface that is at least shaped as an inverted T, such that the heat impulse is configured to seal at least a portion of side edge regions of the two adjacent interconnected pouches and to seal at least a portion of bottom edge regions of the two adjacent interconnected pouches,
and wherein at least one, preferably each, of the first and second jaws comprises an inductor which is electrically insulated from the respective susceptor element, wherein the inductor comprises an elongated inductor section that extends along the respective front surface at the rear side of the respective at least one susceptor element, and wherein the sealing station comprises a high frequency electric current source, which is connected to the inductor of each of the first and second jaws, wherein the sealing station is configured so that, in the impulse sealing cycle, the electric current source is operated to temporarily feed a high frequency electric current to the one or more inductors, thereby generating a high frequency electromagnetic field with the one or more inductors, wherein the high frequency electromagnetic field induces eddy currents in the respective susceptor element generating an impulse of heat that is emitted by the susceptor element, which one or more impulses of heat seal the bottom regions of the pouches.

2. Production machine according to claim 1, wherein the production machine is configured to provide a string of interconnected pouches with a bottom gusset to the sealing station, and wherein the first and second walls and bottom gusset portions of two adjacent interconnected pouches are clamped against one another by the front surfaces of the first and second jaws in their clamped position, and wherein each of the first and second jaws comprises a susceptor element and an inductor.

3. Production machine according to claim 1, wherein each of the susceptor elements comprises three elongated susceptor parts.

4. Production machine according to claim 1, wherein the inductor of a jaw comprises multiple elongated inductor parts are interconnected at a central portion of the inductor.

5. Production machine according to claim 1, wherein the inductor of a jaw comprises multiple elongated inductor sections that extend along each other and that are spaced from one another by a slit.

6. Production machine according to claim 4, wherein the inductor comprises three elongated inductor parts.

7. Production machine according to claim 1, wherein the inductor of a jaw has the shape of an inverted T and comprises first, second and third inductor parts, each inductor part comprising multiple elongated inductor sections, multiple elongated inductor sections of an inductor part being interconnected at an outer end of the inductor part of the T in series.

8. Production machine according to claim 1, wherein the machine is configured such that cooling of the jaw is active during the entire impulse sealing cycle.

9. Production machine according to claim 1, wherein the susceptor element is made of metal material.

10. Production machine according to claim 1, wherein each jaw is provided with a single continuous susceptor element embodied as an inverted T-shaped body with three elongated susceptor parts that are shaped as strips.

11. Production machine according to claim 1, wherein a thickness of the susceptor element is small in comparison to a thickness of the inductor, wherein a spacing in between the rear side of the susceptor element and the neighbouring inductor section(s) is filled with a resilient material such as silicone rubber and/or Teflon.

12. Production machine according to claim 1, wherein the production machine comprises a conveyance mechanism that is configured to convey the string of interconnected pouches along a path of conveyance in a continuous motion said path at least extending along the sealing station, and wherein the sealing station comprises a motion device that is configured to move the first and second jaws in synchronicity with the continuously moving string of pouches during the impulse sealing cycle.

13. Production machine according to claim 1, further comprising one or more of:
   a roll handling station adapted to receive one or more rolls of heat-sealable film material,
   one or more pouch forming stations adapted and operated to form the film material dispensed by the roll handling station into a succession of pouches, each pouch optionally having at least one bottom gusset at its bottom region, being formed by two folded bottom lobes below a triple point of the pouch,
   a feed mechanism adapted and operated to feed said formed pouches to the sealing device, which devices may be located at one at the same station.

14. Production machine according to claim 13, further comprising a filling station, configured to fill a product into the pouch.

15. Method for the production of collapsible pouches, wherein use is made of a production machine according to claim 1, the method comprising the steps of:
   bringing the first and second jaws into the clamped position with the actuator device, so that—in the bottom regions—the first and second walls are clamped against one another by the front surfaces of the first and second jaws,
   in the clamped position, operating the electric current source to temporarily feed a high frequency electric current to the one or more inductors, thereby generating a high frequency electromagnetic field with the one or more inductors, wherein the high frequency electromagnetic field induces eddy currents in the respective susceptor element generating an impulse of heat that is emitted by the susceptor element, which one or more impulses of heat seal the bottom regions of the pouches,
   establishing a continuous circulation of liquid coolant through the one or more cooling ducts, to cool down the first and second jaws, at least the one or more impulse heatable members thereof, after termination of the energizing assisted, and
   moving the first and second jaws into the opened position with the actuator device after the one or more impulse heatable members have cooled down.

* * * * *